United States Patent
Duncan (10) Patent No.: US 11,301,260 B2
(45) Date of Patent: *Apr. 12, 2022

(54) CONFIGURABLE OPTION ROM

(71) Applicant: Micron Technology, Inc., Boise, ID (US)

(72) Inventor: Kevin R. Duncan, Ramsey, MN (US)

(73) Assignee: Micron Technology, Inc., Boise, ID (US)

(*) Notice: Subject to any disclaimer, the term of this patent is extended or adjusted under 35 U.S.C. 154(b) by 28 days.

This patent is subject to a terminal disclaimer.

(21) Appl. No.: 16/885,600

(22) Filed: May 28, 2020

(65) Prior Publication Data

US 2020/0293334 A1    Sep. 17, 2020

Related U.S. Application Data

(63) Continuation of application No. 16/052,995, filed on Aug. 2, 2018, now Pat. No. 10,713,060.

(51) Int. Cl.
*G06F 9/4401* (2018.01)
*G06F 12/02* (2006.01)

(52) U.S. Cl.
CPC ........ *G06F 9/4406* (2013.01); *G06F 12/0223* (2013.01); *G06F 2212/202* (2013.01)

(58) Field of Classification Search
CPC .......................... G06F 9/4406; G06F 12/0223
USPC ........................................................... 713/2
See application file for complete search history.

(56) References Cited

U.S. PATENT DOCUMENTS

| | | | |
|---|---|---|---|
| 4,885,770 A | 12/1989 | Croll | |
| 5,418,918 A | 5/1995 | Vander Kamp | |
| 6,591,363 B1 | 7/2003 | von Below | |
| 6,691,160 B1 | 2/2004 | Bradley | |
| 7,487,343 B1 | 2/2009 | Insley | |
| 10,713,060 B2* | 7/2020 | Duncan | G06F 12/0223 |
| 2005/0120219 A1* | 6/2005 | Munetoh | G06F 21/52 |
| | | | 713/176 |
| 2005/0283606 A1 | 12/2005 | Williams | |
| 2007/0043938 A1 | 2/2007 | May | |
| 2009/0327675 A1 | 12/2009 | Cherian | |
| 2010/0011350 A1 | 1/2010 | Zayas | |
| 2010/0095106 A1 | 4/2010 | Alexander | |
| 2010/0180110 A1 | 7/2010 | Mittapalli et al. | |
| 2012/0102311 A1 | 4/2012 | Mittapalli et al. | |
| 2012/0144391 A1* | 6/2012 | Ueda | G06F 9/45558 |
| | | | 718/1 |
| 2012/0151201 A1 | 6/2012 | Clerc | |
| 2013/0276128 A1 | 10/2013 | Konetski et al. | |
| 2014/0129820 A1* | 5/2014 | Lim | G06F 9/4401 |
| | | | 713/2 |

(Continued)

*Primary Examiner* — Paul R. Myers
(74) *Attorney, Agent, or Firm* — Brooks, Cameron & Huebsch, PLLC (57) ABSTRACT

An example apparatus can include a host device and an apparatus including a memory device and a controller coupled to the memory device, wherein the host device is configured to send a command to read an image to configure the host to boot from the memory device to the controller and wherein a base address register is configured to receive the command, indicate the size of the image, and redirect the command to a first image in memory using a first register that indicates a size of the first image and a second register that indicates a location of the first image.

20 Claims, 4 Drawing Sheets

(56) References Cited

U.S. PATENT DOCUMENTS

| | | |
|---|---|---|
| 2014/0297916 A1 | 10/2014 | Shah et al. |
| 2014/0297917 A1 | 10/2014 | Shah et al. |
| 2018/0024895 A1 | 1/2018 | Kumarasamy |
| 2019/0018966 A1 | 1/2019 | Khatri |

* cited by examiner

CONFIGURABLE OPTION ROM

PRIORITY INFORMATION

This application is a Continuation of U.S. application Ser. No. 16/052,995, filed on Aug. 2, 2018, the contents of which are incorporated herein by reference.

TECHNICAL FIELD

The present disclosure relates generally to memory devices, and more particularly, to apparatuses and methods for configurable option ROM.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

A storage device may include one or more memory components that store data. For example, a solid-state drive (SSD) may include memory devices such as non-volatile memory devices. The storage device may further include a storage device controller that may manage each of the memory devices and allocate data to be stored at the memory devices. A host system may utilize the storage device, and write data to and/or request data from the storage device. The storage device controller may be used to retrieve data from the corresponding memory devices and return the retrieved data to the host system.

DETAILED DESCRIPTION

Aspects of the present disclosure are directed to apparatuses and methods for configurable option ROM. Various embodiments provide technological advantages such as improved boot options for a computing system by selecting a particular image stored in memory on a memory system, pointed to by a base address register (BAR), to be used to configure the computing system to be able to boot from the memory device. As an example, for storage systems (e.g., solid state drives) with registers, such as option ROM in memory that are used to boot from the memory devices, embodiments of the present disclosure can utilize a controller to configure and update registers with the size and location in internal memory space of an image selected for use when configuring the computing system to boot from a memory device. The controller can configure the BAR to indicate to the computing system the correct size of the image selected to boot from the memory device.

In a number of embodiments, memory on a memory system can store a number of images that can be used to configure a computing system to boot from a memory device of the memory system. For example, a first image of a first particular size can be stored in a first location in memory and a second image of a second particular size can be stored in a second location in memory. Any number of images can be stored in memory and used to configure a computing system to boot from a memory device of the memory system. The images stored in memory can be selected by the controller for use when booting from a memory device. The controller can update registers that indicate the size and location in internal controller memory space of the image that was selected to configure the computing system to be able to boot from the memory device. The controller can also update the BAR to indicate to the computing system the size of the image selected to configure the computing system to boot from the memory device via the registers that indicate the size and internal memory location of the image. Embodiments of the present disclosure, allow a memory system to store a plurality of images having a plurality of sizes that can be selected to configure the computing system to boot from a memory device by loading the selected image pointed to by the BAR.

Figure 1:
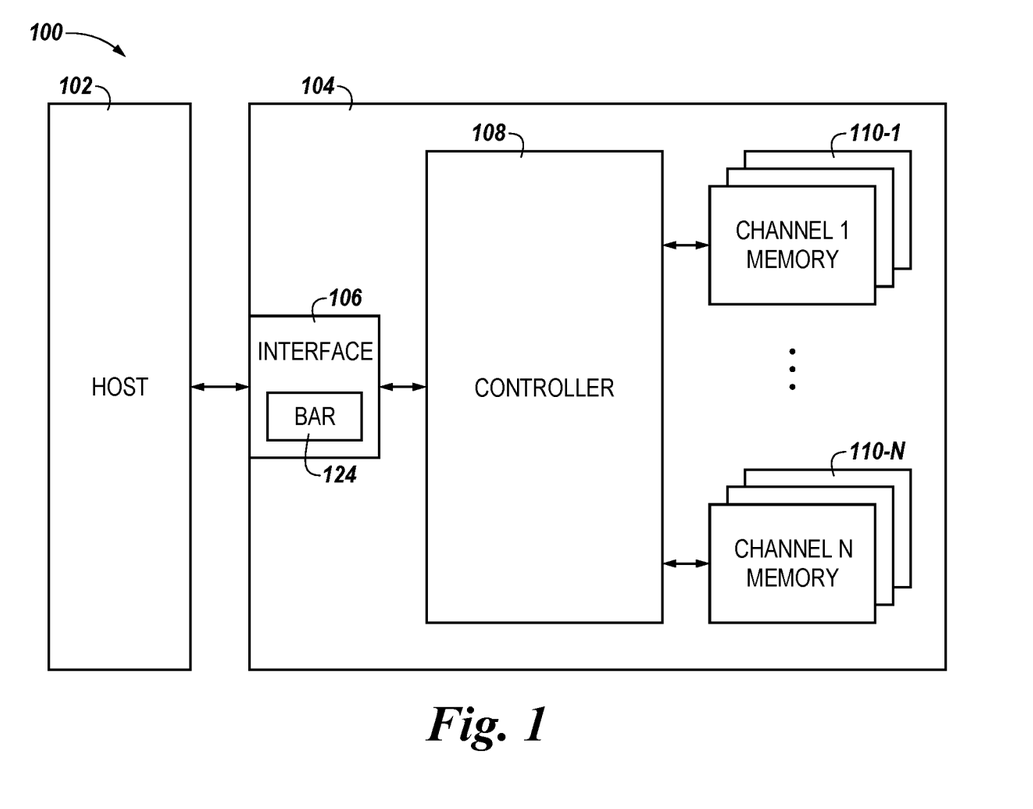
FIG. 1 illustrates a block diagram of an apparatus in the form of a computing system with configurable option ROM in accordance with a number of embodiments of the present disclosure.

FIG. 1 illustrates a block diagram of an apparatus in the form of a computing system with configurable option ROM in accordance with a number of embodiments of the present disclosure. As used herein, an "apparatus" can refer to, but is not limited to, a variety of structures or combinations of structures. For instance, memory system 104, controller 108, and memory devices 110-1 to 110-N might separately be considered an "apparatus".

The memory system 104 can be, for example, a storage system such as a solid state drive (SSD), and can include an interface 106, a controller 108 (e.g., a processor and/or other control circuitry), and a number of memory devices 110-1, . . . , 110-N, which may be referred to collectively as memory devices 110. The memory devices 110 can provide a storage volume for the memory system 104; however, one or more of the memory devices 110 may function as main memory for system 100.

As illustrated in FIG. 1, memory system 104 can be coupled to a host 102 via interface 106. Host 102 can be a host system such as a personal laptop computer, a desktop computer, a digital camera, a mobile device (e.g., cellular phone), network server, Internet of Things (IoT) enabled device, or a memory card reader, among various other types of hosts. Host 102 can include a number of memory access devices (e.g., a number of processors) capable of accessing memory devices 110 (e.g., via controller 108).

In the example illustrated in FIG. 1, the controller 108 is coupled to the memory devices 110 via multiple channels (e.g., CHANNEL 1 MEMORY, . . . , CHANNEL N MEMORY) and can be used to transfer data between the memory system 104 and host 102 (e.g., via interface 106). The interface 106 can be in the form of a standardized interface. For example, when the memory system 104 is used for data storage in a computing system 100, the interface 106 can be a serial advanced technology attachment (SATA), peripheral component interconnect express (PCIe), or a universal serial bus (USB), among other connectors and interfaces. In general, however, interface 106 can provide an interface for passing control, address, data, and other signals between the memory system 104 and a host 102 having compatible receptors for the interface 106. Interface 106 can include base address register (BAR) 124. BAR 124 can be updated by controller 108 to indicate the size of an image and written to by host 102 to locate the image within the memory space of computing system 100. Registers internal to controller 108 can be used to update the size of BAR 124 and indicate the location of the image in internal memory space 110, allowing host 102 to access a selected image (e.g., option ROM (OROM)) to configure the computing system 100 to boot from memory device 110.

The controller 108 can communicate with the memory devices 110 to control data read, write, and erase operations, among other operations. Although not specifically illustrated, in some embodiments, the controller 108 can include a discrete memory channel controller for each channel coupling the controller 108 to the memory devices 110. The controller 108 can include, for example, a number of components in the form of hardware (e.g., one or more integrated circuits) and/or software (e.g., instructions, which may be in the form of firmware) for controlling access to the number of memory devices 110 and/or for facilitating data transfer between the host 102 and memory devices 110. In general, the controller 108 can receive commands (e.g., operations) from the host 102 and can convert the commands into instructions or appropriate commands to achieve the desired access to the memory devices 110.

As described further herein, the controller 108 can be responsible for, among other operations, updating registers used to allow booting from memory devices 110. Controller 108 can update base address register (BAR) 124 in the memory system 104. The BAR can be configured to indicate a particular size, such as the size of the image used to boot memory device 110 of system 100. The image can provide the information to make the memory devices 110 of the memory system 104 bootable within the computing system 100. Controller 108 can update registers that identify an internal memory location of an image that allows booting from memory device 110 and a size of an image that allows booting from memory devices 110. Controller 108 can update the BAR based on the information in the register that identifies the size of the image for booting from memory device 110.

The memory devices 110 can include a number of arrays of memory cells. The memory devices 110 can include two-dimensional (2D) and/or three-dimensional (3D) array structures such as cross point array structures. The memory cells can include, for example, various types of cells, such as Flash memory cells, and/or memory cells having a resistance variable storage element and/or switch element (e.g., PCRAM cells, RRAM cells). As used herein, a storage element refers to a programmable portion of a memory cell. For instance, the memory devices 110 can be 3D cross point devices whose cells can include a "stack" structure in which a storage element is coupled in series with a switch element and which can be referred to herein as a 3D phase change material and switch (PCMS) device. 3D PCMS cells can include, for example, a two-terminal chalcogenide based storage element coupled in series with a two-terminal chalcogenide based switch element such as an ovonic threshold switch (OTS). In a number of embodiments, the memory cells can be self-selecting memory (SSM) cells in which a single material can serve as both the storage element and the memory element. An SSM cell can include a chalcogenide alloy; however, embodiments are not so limited.

As non-limiting examples, the memory cells of memory devices 110 can include a phase change material (e.g., phase change chalcogenide alloy) such as an indium (In)-antimony (Sb)-tellurium (Te) (IST) material (e.g., $In_2Sb_2Te_5$, $In_1Sb_2Te_4$, $In_1Sb_4Te_7$, etc.) or a germanium (Ge)-antimony (Sb)-tellurium (Te) (GST) material (e.g., $Ge_2Sb_2Te_5$, $Ge_1Sb_2Te_4$, $Ge_1Sb_4Te_7$, etc.).

Controller 108 can include memory for storing a first image in a first location in memory of a memory system, wherein the first image is a first particular size; and a second image in a second location in the memory of the memory system, wherein the first image is a second particular size. The controller 108 can select either the first image or the second image for use in booting from memory device 100. For example, controller 108 can select the first image for use in booting from memory device 110. In response to selecting the first image, the controller 108 can update registers that indicate the internal memory location of the selected first image and the size of the selected first image. The controller 108 can configure the base address register (BAR) to indicate to host 102 the correct size of the selected first image based on the information in the updated registers.

The various components of controller 108, such as the firmware and/or hardware used to perform commands to update registers, configure the size of images, and boot from memory devices, can be discrete components such as application specific integrated circuit (ASICs) or the components may reflect functionally provided by circuitry and/or firmware within the controller 108 that does not necessarily have a discrete physical form separate from other portions of the controller 108. Although described as firmware and/or hardware within the controller 108 in FIG. 1, each of the functions described as being performed by the controller 108 or portions thereof, can be performed by firmware and/or hardware that is external to the controller 108.

Figure 2:
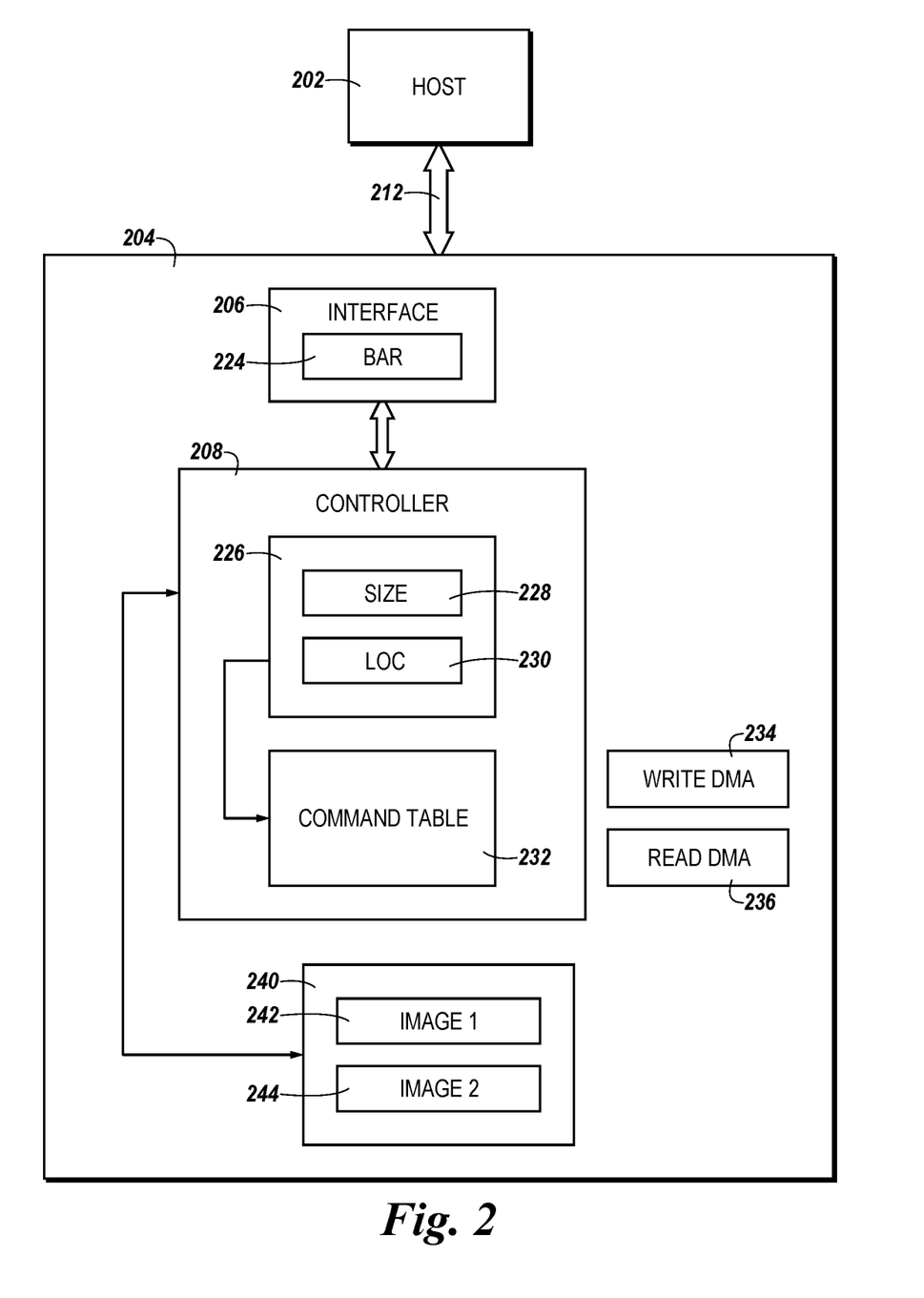
FIG. 2 illustrates a block diagram of an apparatus in the form of a computing system with configurable option ROM in accordance with a number of embodiments of the present disclosure.

FIG. 2 illustrates a block diagram of an apparatus in the form of a computing system with configurable option ROM in accordance with a number of embodiments of the present disclosure. As used herein, an "apparatus" can refer to, but is not limited to, a variety of structures or combinations of structures. For instance, memory system 204, controller 208, and memory 240 might separately be considered an "apparatus".

The memory system 204 can be coupled to host 202 via bus 212. Host 202 can send commands to interface 206 via bus 212, such as boot commands and/or operation commands (e.g., read, write, and/or erase command). The controller 208 can communicate with memory devices and other components, such as register block 226, command table 232, memory 240, write DMA component 234, read DMA component 236, and/or interface 206, to data read, write, and erase operations, among other operations. The controller 208 can include, for example, a number of components in the form of hardware (e.g., one or more integrated circuits) and/or software (e.g., instructions, which may be in the form of firmware) for controlling execution of command on/access to components of the memory system 204 and memory devices and/or for facilitating data transfer between the host 202 and memory devices, such as memory device 110 in FIG. 1.

Memory 240 can store Image 1 242 and Image 2 244. Image 1 242 (e.g., option ROM (OROM) Image 1) can be a particular size (e.g., a particular number of bytes) and be stored in a particular location in memory 240. Image 2 244 (e.g., option ROM (OROM) Image 2) can be a particular size (and be stored in a particular location in memory 240. Memory 240 store a number of images, each in a particular location and having a particular size. The images can be used to configure the host 202 to boot from memory device of the memory system 204. Memory 240 can be volatile (e.g., DRAM) and/or non-volatile memory.

As described further herein, the controller 208 can be responsible for, among other operations, updating size register 228 and location register 230 used to configure host 202 to boot from memory devices of memory system 204. Image 1 242 and/or image 2 244 can be selected to be used to configure host 202 to boot from memory devices, such as memory devices 110 in FIG. 1, in memory system 204. In a number of embodiments, any number of images of any size can be stored and used to configure host 202 to boot from memory devices.

Controller 208 can update base address register (BAR) 224. BAR 224 can be configured to indicate to host 202 an image of a particular size, such as the size of Image 1 242 used by host 202 to boot from a memory device. Controller 208 can update location register 230 that identifies a internal memory location in memory 240 of an image (e.g., Image 1 242 and/or Image 2 244) for booting from memory devices and size register 228 that identifies size of an image (e.g., Image 1 242 and/or Image 2 244) for booting from memory devices. Controller 208 can update BAR 224 based on the information in size register 228 that identifies the size of the selected image to indicate to host 202 the correct size of the selected image used to configure host 202 to boot from the memory device.

When host 202 begins to boot a system, host 202 can issue read commands to controller 208 from the address in BAR 224 to read out the image from 240 described by the size register 228 and the location register 203. Controller 208 can locate the image (e.g., Image 1 242 and/or Image 2 244) to host 202. Host 202 can be configured to boot from memory devices using the image pointed to by BAR 224.

Figure 3:
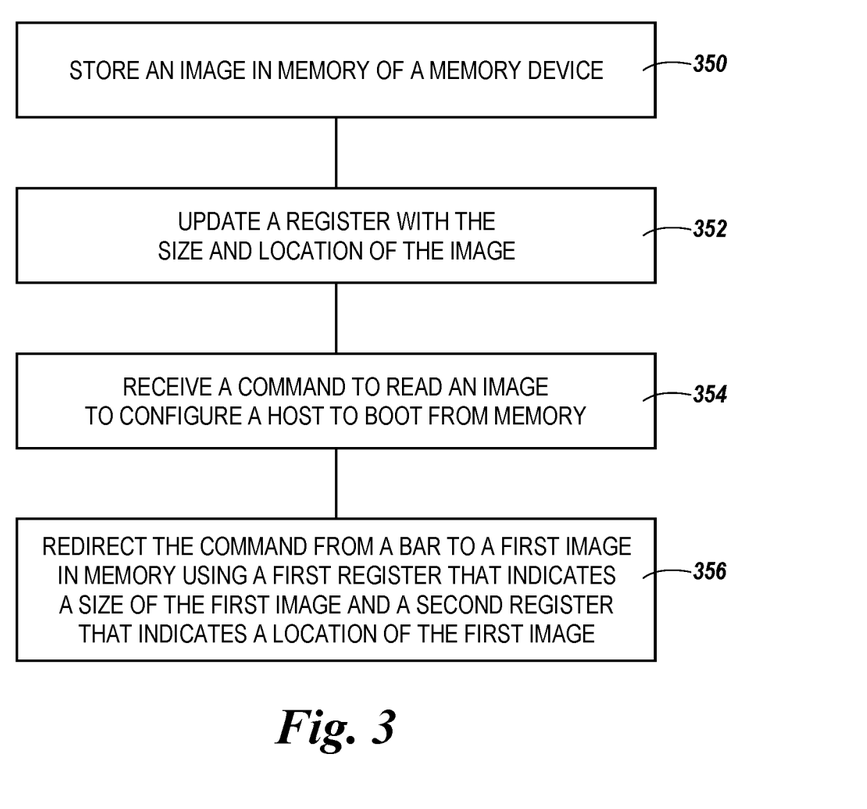
FIG. 3 is a flow diagram illustrating an example option ROM configuration process in accordance with a number of embodiments of the present disclosure.

FIG. 3 is a flow diagram illustrating an example option ROM configuration process in accordance with a number of embodiments of the present disclosure. The process described in FIG. 3 can be performed by, for example, a controller such as controller 108 shown in FIG. 1. At block 350, a controller can store an image in memory of a memory device. A number of images can be stored in memory. The number of images can each be stored in particular locations in memory and can each have a particular size. The memory can be system memory used by the memory devices and/or memory on a controller, such as controller 108 shown in FIG. 1.

At block 352, the process includes updating a first register to indicate a size of an image and update a second register to indicate a location of the image in memory of a memory system. The controller can update a register and/or registers to indicate that location where the image is stored and also the size of the image that is stored. This size and location information can be used by the controller to locate the image for loading an image option ROM that is used to configure the host to boot from memory devices. In a number of embodiments, a number of images can be stored in memory, each stored in a particular location and each having a particular size. One of the number of images can be selected to be used to configure the host to boot from memory devices.

At block 354, the process includes receiving a command to read an image to configure a host to boot from the memory A base address register (BAR) can be updated to indicate to the host the correct size of the image via the first register. The controller can use the BAR to point to the image, via registers, that is stored in memory and used to configure the host to boot from the memory device. The BAR can be configured to be a size that corresponds to the image stored in memory.

At block 356, the process includes redirecting the command from a base address register (BAR) to a first image in memory using a first register that indicates a size of the first image and a second register that indicates a location of the first image The selected image can be returned to the host using the BAR to locate the image in the memory via the second register and load the image via the first register. The controller can locate the image in memory based on the information in the registers. The host can use the information from the read image to configure the host to boot from a memory device on a memory system.

Figure 4:
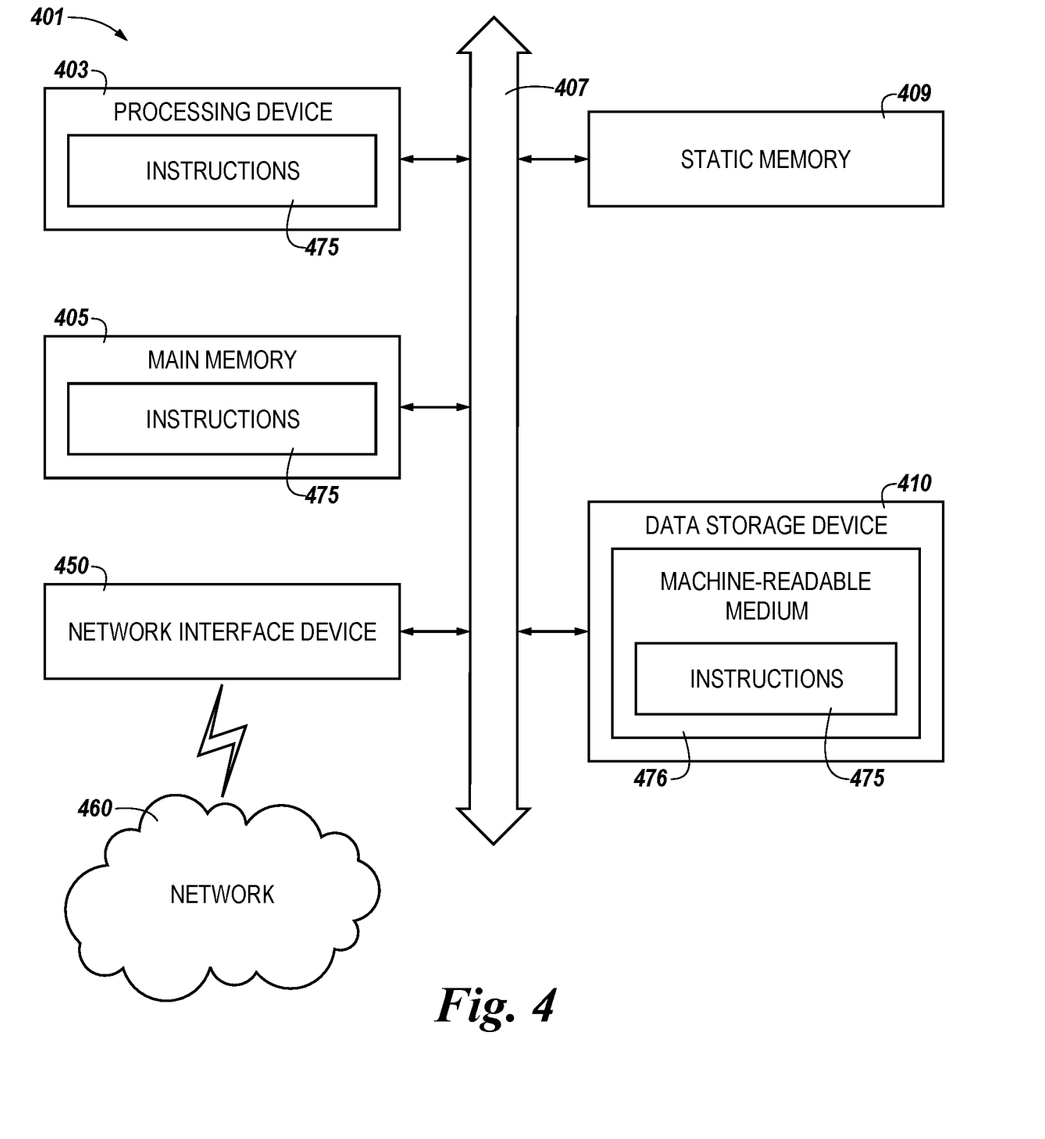
FIG. 4 illustrates an example machine of a computing system within which a set of instructions, for causing the machine to perform any one or more of the methodologies discussed herein, may be executed.

FIG. 4 illustrates an example machine of a computing system 400 within which a set of instructions, for causing the machine to perform any one or more of the methodologies discussed herein, may be executed. For example, the computing system 400 may correspond to a host system (e.g., the host 102 of FIG. 1) that includes or utilizes a memory system (e.g., the memory system 104 of FIG. 1) or may be used to perform the operations of a controller. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein. The example computing system 400 includes a processing device 403, a main memory 405 (e.g., read-only memory (ROM), flash memory, dynamic random access memory (DRAM) such as synchronous DRAM (SDRAM) or Rambus DRAM (RDRAM), etc.), a static memory 409 (e.g., flash memory, static random access memory (SRAM), etc.), and a data storage device 410, which communicate with each other via a bus 407.

Processing device 403 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 403 may also be one or more special-purpose processing devices such as an application specific integrated circuit (ASIC), a field programmable gate array (FPGA), a digital signal processor (DSP), network processor, or the like. The processing device 403 is configured to execute instructions 475 for performing the operations and steps discussed herein. The computing system 400 may further include a network interface device 450 to communicate over the network 460.

The data storage device 410 may include a machine-readable storage medium 476 (also known as a computer-readable medium) on which is stored one or more sets of instructions or software 475 embodying any one or more of the methodologies or functions described herein. The instructions 475 may also reside, completely or at least partially, within the main memory 405 and/or within the processing device 403 during execution thereof by the computing system 400, the main memory 405 and the processing device 403 also constituting machine-readable storage media. The machine-readable storage medium 476, data storage device 410, and/or main memory 405 may correspond to the memory system 104 of FIG. 1.

In one implementation, the instructions 475 include instructions to implement functionality corresponding to a programming component. While the machine-readable storage medium 476 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, aspects of the present disclosure may refer to the action and processes of a computing system, or similar electronic computing device, that manipulates and transforms data represented as physical (electronic) quantities within the computing system's registers and memories into other data similarly represented as physical quantities within the computing system memories or registers or other such information storage systems.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computing system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computing system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. An apparatus, comprising:
a memory device; and
a controller coupled to the memory device configured to:
update a first register indicating a size of an image in option ROM to configure a host to boot from the memory device and update a second register indicating a location of the image in option ROM in memory; and
select the image to allow a host to use the image to configure the host to boot from the image.

2. The apparatus of claim 1, wherein the apparatus includes memory that stores the image having a particular size stored in a particular location.

3. The apparatus of claim 1, wherein the controller is configured to update a base address register (BAR) to point to the image.

4. The apparatus of claim 1, wherein the apparatus includes memory that stores another image having another size stored in another location.

5. The apparatus of claim 4, wherein the controller is configured to update the first register indicating a size of the another image and update the second register indicating a location of the another image in memory.

6. The apparatus of claim 5, wherein the controller is configured to select the another image to allow the host to use the another image to configure the host to boot from the another image.

7. The apparatus of claim 1, wherein the controller includes firmware to update the first register and the second register.

8. A system comprising:
   a host; and
   an apparatus including a memory device and a controller coupled to the memory device;
      wherein the host is configured to send a command to read an image to configure the host to boot from the memory device to the controller; and
      wherein the controller is configured to direct the command to a first image in memory of the memory device to boot the host using a first register that indicates a size of the first image and a second register that indicates a location of the first image.

9. The system of claim 8, wherein the controller is configured to update the first register indicating the size of the image and update the second register indicating the location of the image in memory.

10. The system of claim 8, wherein a base address register is configured to receive the command, indicate the size of the image, and redirect the command to the first image in memory.

11. The system of claim 10, wherein the controller configures the base address register (BAR) to be a particular size based on the size of the first image.

12. The system of claim 8, wherein a second image is stored in a second location in memory.

13. The system of claim 12, wherein the controller is configured to update the first register indicating a size of the second image and update the second register indicating a location of the second image in memory.

14. The system of claim 8, wherein the host is configured, using the image read from memory based on the size and location indicated by the first and second registers, to boot from the memory device.

15. A method, comprising:
   updating a first register to indicate a size of an image and update a second register to indicate a location of the image in memory of a memory system;
   receiving a command to read an image to configure a host to boot from the memory; and
   directing the command to the image in the memory using a first register that indicates a size of the first image and a second register that indicates a location of the first image.

16. The method of claim 15, further including storing the first image in the location in DRAM on the memory system.

17. The method of claim 15, further including configuring a base address register (BAR) to indicate the size of the image and redirect the command to the first image in memory.

18. The method of claim 15, further including configuring the host to boot from memory based on the first image.

19. The method of claim 17, further including storing another image in another location in DRAM on the memory system.

20. The method of claim 19, further including updating the first register to indicate a size of the another image and updating the second register to indicate a location of the another image in memory.

\* \* \* \* \*